United States Patent
Dodge, Sr.

(10) Patent No.: US 6,349,483 B1
(45) Date of Patent: Feb. 26, 2002

(54) GUIDE ATTACHMENT FOR A MEASURING TAPE

(76) Inventor: Dennis M. Dodge, Sr., 5314 195th Ave. E., Bonney Lake, WA (US) 98390

( * ) Notice: Subject to any disclaimer, the term of this patent is extended or adjusted under 35 U.S.C. 154(b) by 0 days.

(21) Appl. No.: 09/524,948

(22) Filed: Mar. 14, 2000

(51) Int. Cl.[7] ............................................. G01B 3/10
(52) U.S. Cl. ...................................... 33/770; 33/758
(58) Field of Search .......................... 33/770, 755, 758, 33/759, 768, 484

(56) References Cited

U.S. PATENT DOCUMENTS

| | | | |
|---|---|---|---|
| 3,336,674 A | * | 8/1967 | Higgins et al. ............... 33/759 |
| 5,214,859 A | * | 6/1993 | Buhler ......................... 33/770 |
| 5,231,769 A | * | 8/1993 | Mahan ......................... 33/770 |
| 5,894,677 A | * | 4/1999 | Hoffman ....................... 33/755 |

FOREIGN PATENT DOCUMENTS

| | | | |
|---|---|---|---|
| GB | 12495 | * 1/1907 | ................... 33/770 |

* cited by examiner

*Primary Examiner*—Christopher W. Fulton
(74) *Attorney, Agent, or Firm*—Delbert J. Barnard

(57) ABSTRACT

A measuring tape hook (16) snugly fits within a slot (26) formed between first and second sidewalls (22, 24), at one end of a guide attachment (18). The guide portion (28) has a concave side (30) facing in the same direction as the open end of the slot (26) and a convex side (32) facing in the same direction as the end wall (24). The hook (16) at an end of a measuring tape (14) is set into the slot (26) and the measuring tape is extended across an uneven surface (34) with the convex side (32) contacting the uneven surface and guiding itself and the hook end (16) of the measuring tape (14) forwardly over th uneven surface (34).

10 Claims, 1 Drawing Sheet

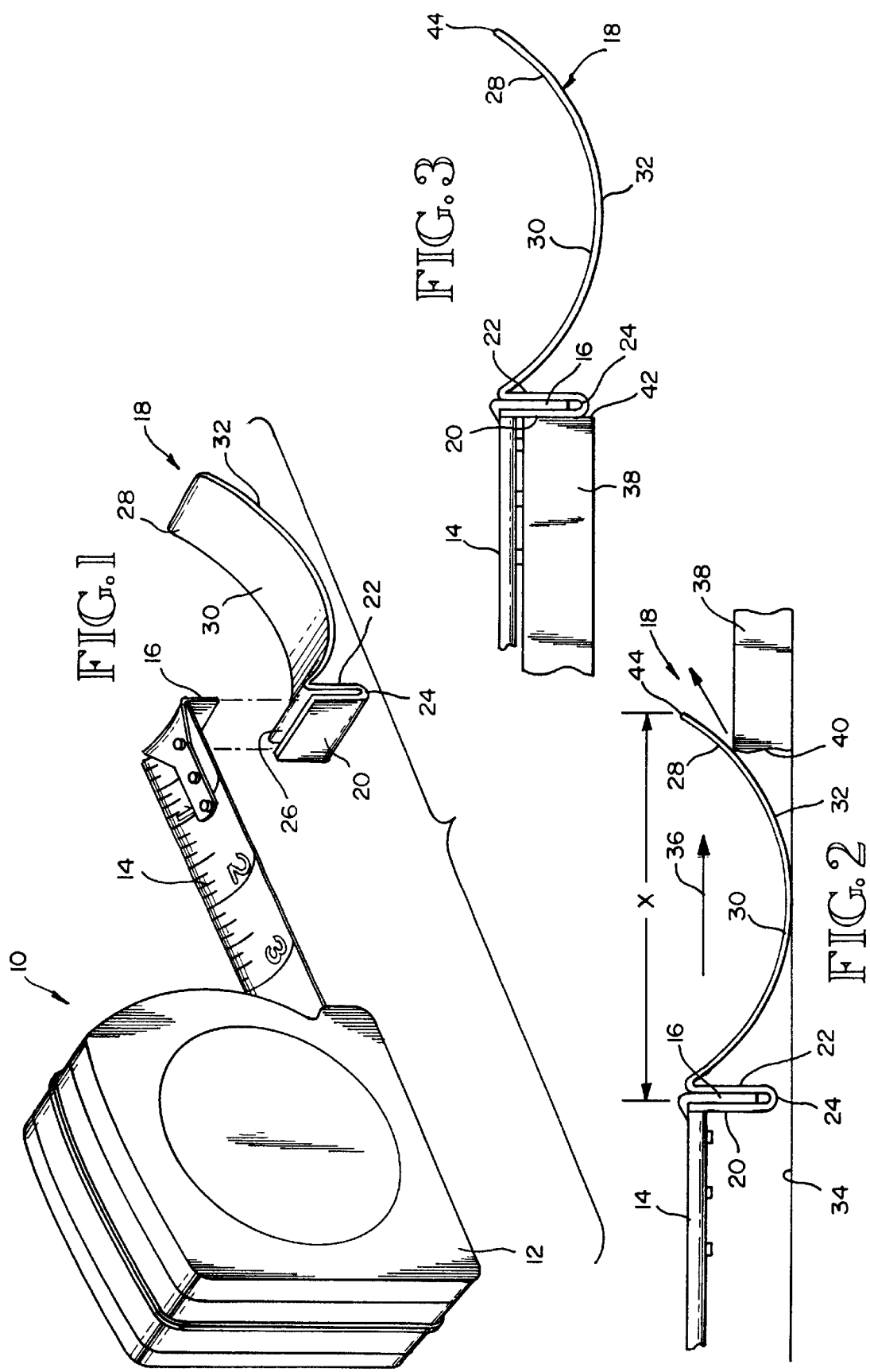

GUIDE ATTACHMENT FOR A MEASURING TAPE

TECHNICAL FIELD

The present invention relates to measuring tapes of a type having a thin tape member that is coiled up inside of a housing and is adapted to be extended outwardly from the housing to make a measurement and to be moved back into the housing for stowage. More particularly, it relates to the provision of a guide attachment for such a tape that is connectable to a hook at the end of the tape and is adapted to guide the hook over surface projections that, if the guide attachment were not used, would be contacted by the hook and stop the tape from being extended.

BACKGROUND OF THE INVENTION

U.S. Pat. No. 5,214,859, granted Jun. 1, 1993, to Randy W. Buhler, describes the difficulty of extending a measuring tape over a shingled roof. It explains that when an attempt is made to push the tape member forwardly over the roof surface, the hook at the leading end of the tape will snag on projecting portions of the roof surface that are in its way. U.S. Pat. No. 5,214,859 discloses a rather complicated guide attachment for a measuring tape. There is a need for a much simpler guide attachment. There is also a need for a guide attachment that will allow the hook to hook onto an end surface remote from the user when it is desired to measure the distance from the user to the end surface. The present invention supplies both of these needs.

BRIEF SUMMARY OF THE INVENTION

An object of the present invention is to provide a thin material member that is formed to include substantially parallel first and second sidewalls interconnected by an end wall to form a narrow slot having an open end opposite the end wall. The slot functions as a socket. It is sized to snugly receive a hook at an end of a measuring tape.

According to another aspect of the invention, the thin metal member is formed to include a guide portion that is connected to the second sidewall. This guide portion curves to provide the guide portion with a concave side facing in the same direction as the open end of the slot and a convex side facing in the same direction as the end wall. In use, a hook at the end of a measuring tape is set into the slot, so as to connect the guide attachment to the hook end of the pate, and the measuring tape is then extended across and uneven surface, with the convex side of the guide attachment contacting the uneven surface. The contact causes the guide attachment to guide itself and the hook end of the measuring tape forwardly over the uneven surface.

Preferably, the guide portion is connected to the second sidewall adjacent the open end of the slot. Preferably also, the guide portion curves first downwardly and then upwardly from such connection, to provide said concave and convex sides.

According to a further aspect of the invention, the first sidewall has an outside surface on its side opposite the slot that is substantially parallel to the slot. As a result, it is also substantially parallel to a measuring tape hook placed in the slot. As a result, the outside surface of the first sidewall can be pulled against a member so as to hook the end of the measuring tape and the guide attachment onto said member.

Yet another aspect of the invention is to position the convex side of the guide attachment relative to the end wall such that when the convex surface is on a support surface the end wall is spaced from the support surface.

A still further aspect of the invention is to provide the guide attachment with an end boundary at its end opposite the slot at a predetermined distance from the measuring tape hook, so that the boundary can be placed against an object and a distance from a spot to said object will be the sum of the distance depicted on the measuring tape at said spot and the predetermined length of the guide attachment.

Other objects, advantages and features of the invention will become apparent from the description of the best mode set forth below, from the drawings, from the claims and from the principles that are embodied in the specific structures that are illustrated and described.

BRIEF DESCRIPTION OF THE SEVERAL VIEWS OF THE DRAWING

In the drawings, like element designations refer to like parts throughout the several views, and:

FIG. 1 is a pictorial view looking towards the top, one side and the back end of a standard measuring tape, such view showing an end portion of the tape extending out from the measuring tape housing, and showing a guiding attachment spaced from the hook at the end of the measuring tape;

FIG. 2 is a fragmentary side elevational view of the attachment and an end portion of the measuring tape, showing the measuring tape and the attachment being moved forwardly over an uneven surface, and showing the guide attachment functioning to cam the hook end portion of the tape up over a projecting member on the uneven surface; and FIG. 3 is a view like FIG. 2, but showing the measuring tape and attachment pulled rearwardly so as to hook the tape hook onto an end surface of a member.

DETAILED DESCRIPTION OF THE INVENTION

FIG. 1 shows a conventional measuring tape 10 of a type that is well known to persons skilled in the building trade art, and in other arts as well. Measuring tape 10 has a housing 12 in which a coiled measuring tape 14 is received. A hook 16 is provided at the outer end of the tape 14. One function of hook 16 is that it prevents the tape from moving completely inside the housing 12. It also serves as a handle for allowing a user to pull the tape 14 out from the housing 12. A characteristic of the measuring tape 14 is that it is laterally curved. As a result, when tape 14 is outside of the housing 12, it is somewhat stiff and can be extended substantially straight. A use of this type of measuring tape 10 is to measure a distance between a spot adjacent the user and a second spot remote from the user. A common practice is for the user to pull the tape 14 out from the housing 12 and push it along whatever surface is between him/her and the remote spot. This is easy to do when the surface is a relatively smooth or even surface. It is difficult and sometimes even impossible to do when the surface is an uneven surface. This is because the hook 16 can, and usually does, catch on a projection from the surface. When this happens it arrests forward movement of the measuring tape 14.

In a typical environment, the spot that is remote from the user is an end surface or an edge surface. A common practices is to extend the tape 14 until the hook 16 moves past the end or edge surface. Then, the tape 14 is pulled back until the hook 16 hooks onto this surface. That allows the user to pull tight on the measuring tape as he/she positions the measuring tape next to the spot that is adjacent him/her. Once the tape is taut and is aligned with the near spot, the user can read the scale on the measuring tape 14 to determine the distance between the two spots.

The guide attachment 18 of the present invention is formed from a thin sheet material, such as sheet metal. It comprises a first sidewall 20 connected to a second sidewall 22 by an end wall 24. These walls 20, 24, 22 are continuous regions of the sheet material. They together form a narrow slot 26 that is closed at end 24 and has an open opposite said end. The material continues from sidewall 22, preferably from adjacent the open end of the slot 26. Preferably, it curves first downwardly and then upwardly to provide a guide portion 28 having a concave side 30 and a convex side 32. The concave side 30 faces in the same direction as the open end of the slot 26. The convex side 32 faces in the same direction as the closed end wall 24. This is clearly shown in FIGS. 1–3.

The slot 26 is a socket. It is sized to snugly receive the hook 16 at the end of the measuring tape 14. The snug fit may frictionally connect the attachment 18 to the tape hook 16. When the measuring tape hook 16 is within the slot 26, the guiding portion 28 of the attachment 18 extends forwardly beyond the measuring tape hook 16 (FIGS. 2 and 3). Referring to FIG. 2, when the convex surface 32 is resting on a support surface 34, the end wall 24 is spaced upwardly from the support surface 34. This spacing assures that the region 16, 20, 22, 24 is positioned where it will not contact a projection from the surface 34.

FIG. 2 shows the measuring tape 14 and the guide attachment 18 being moved to the right, as indicated by the arrow 36. The user (not shown) is extending the measuring tape 14 out from the housing 12, to cause the movement. FIG. 2 shows a projection 38 on the support surface 34. It provides an end surface 40 in the path of the measuring tape hook 16. If the guide attachment 18 were not being used, the forward extension of measuring tape 14 would move the hook 16 against surface 40 and forward movement would most likely be arrested by the contact.

As shown by FIG. 2, with the guide attachment 18 installed, the lower convex surface 32 of the guide portion 28 makes contact with the corner formed where end surface 40 meets the upper surface of projection 38. This contact cams the guide portion 28 of guide attachment 18 up and over the projection 38. Owing to the vertical spacing of end wall 24 to the crest of convex surface 32, when the convex surface 32 is on top of the projection 38, the end wall 24 will be spaced above the top of the projection 38. Thus, there will be no contact between walls 22, 24 and wall 40 as the measuring tape 14 is being extended to move walls 22, 24 past wall 40.

FIG. 3 illustrates an additional capability of the guide attachment 18. Placement of the measuring tape hook 16 into the slot 26 in effect creates a thicker hook at the end of the measuring tape 14. The new hook 16, 20, 22, 24 can be used like the measuring tape hook 16 alone. That is, the measuring tape 14 can be extended to move the hook 16, 20, 22, 24 past an end surface 42. Then, the measuring tape 14 can be pulled rearwardly to move sidewall 20 against end surface 42. Then, the measuring tape 14 can be pulled taut and a measurement between surface 42 and a spot adjacent the user can be made by the user. The thickness of wall 20 will make the measurement longer by an amount equal to the thickness of wall 20. If this makes a difference, the user can subtract the thickness of wall 20 from the measurement to arrive at a true measurement.

Preferably, the distance between the inside surface of measuring tape hook 16 and the forward tip 44 of the guide attachment 18 will be a set distance X, e.g. three (3"). This will enable the user to extend the measuring tape 14 outwardly until the tip 44 is against a wall or other surface. Then, the user need only read the measurement on the tape at the spot near him/her and add to it the additional distance X than is provided by the length of the guide attachment 18.

The guide attachment 18 is relatively simple in construction and requires only a small amount of material and is easy to manufacture. A suitable sheet metal material can be cut into strips of the right width. Then, a strip material can be cut to length and suitably machined to form the illustrated configuration of the guide attachment 18. Or, one could extrude a member having a cross sectional shape like the profile of the guide attachment shown in FIGS. 2 and 3. Then, the extruded member can be cut to form a number of the guide attachments 18.

As illustrated, the material used to make the guide attachment 18 may have a thickness that is substantially equal to the thickness of the hook 16. The guide attachment 18 may have a width that is substantially equal to the width of the measuring tape 14.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A guide attachment for the hook end of a measuring tape, comprising:

thin material member formed to include substantially parallel first and second sidewalls interconnected by an end wall to form a narrow slot having an open end opposite the end wall, said slot being sized to snugly receive a hook at an end of a measuring tape; and a guide portion connected to the second sidewall adjacent the open end of the slot, and curving first downwardly and then upwardly from such connection, to provide the guide portion with a concave side facing in the same direction as the open end of the slot and a convex side facing in the same direction as the end wall, whereby a hook at an end of a measuring tape can be set into the slot and the measuring tape can be extended across an uneven surface, with the convex side of the guide portion contacting the surface and guiding itself and the hook end of the measuring tape forwardly over the uneven surface.

2. The guide attachment of claim 1, wherein the first side member has a side surface on its side opposite the slot that is substantially parallel to the slot, so that it will also be substantially parallel to a measuring tape hook placed in the slot, whereby said outside surface can be pulled against a member so as to hook the end of the measuring tape and the guide attachment onto said member.

3. The guide attachment of claim 1, wherein the convex side of the guide attachment is positioned relative to the end wall such that when the convex surface is on a support surface the end wall is spaced from the support surface.

4. The guide attachment of claim 3, wherein the first side member has an outside surface on its side opposite the slot that is substantially parallel to the slot, so that it will also be substantially parallel to a measuring tape hook placed in the slot, whereby said side surface can be pulled against a member so as to hook the end of the measuring tape and the guide attachment onto said member.

5. The guide attachment of claim 1, wherein said slot is sized to snugly receive and frictionally grip a hook at an end of a measuring tape.

6. The guide attachment of claim 5, wherein the first side has an outside surface on its side opposite the slot that is substantially parallel to the slot, so that it will also be substantially parallel to a measuring tape hook placed in the slot, whereby said side surface can be pulled against a member so as to hook the end of the measuring tape and the guide attachment onto said member.

7. The guide attachment of claim 5, wherein the convex side of the guide attachment is positioned relative to the end wall such that when the convex surface is on a support surface the end wall is spaced from the support surface.

8. The guide attachment of claim 1, having an end boundary at its end opposite the slot at a predetermined distance from the measuring tape hook, so that the boundary can be moved against an object and a distance from a spot to said object will be the sum of the distance depicted on the measuring tape at said spot and the predetermined length of the guide attachment.

9. The guide attachment of claim 8, wherein the first side member has an outside surface on its side opposite the slot that is substantially parallel to the slot, so that it will also be substantially parallel to a measuring tape hook placed in the slot, whereby said side surface can be pulled against a member so as to hook the end of the measuring tape and the guide attachment onto said member.

10. The guide attachment of claim 9, wherein the convex side of the guide attachment is positioned relative to the end wall such that when the convex surface is on a support surface the end wall is spaced on the support surface.

* * * * *